(12) United States Patent
Ho

(10) Patent No.: US 8,305,226 B2
(45) Date of Patent: Nov. 6, 2012

(54) DRINKING WATER LEVEL ALARM LAMP

(75) Inventor: Ying-Kuan Ho, Tainan (TW)

(73) Assignee: Ying Yeeh Enterprises Co., Ltd., Tainan (TW)

( * ) Notice: Subject to any disclaimer, the term of this patent is extended or adjusted under 35 U.S.C. 154(b) by 335 days.

(21) Appl. No.: 12/652,775

(22) Filed: Jan. 6, 2010

(65) Prior Publication Data

US 2011/0163883 A1 Jul. 7, 2011

(51) Int. Cl.
*G08B 5/36* (2006.01)
(52) U.S. Cl. ............... 340/815.73; 340/549; 340/615; 340/689; 340/691.1; 340/815.4
(58) Field of Classification Search .......... 340/603, 340/612, 615, 623–625, 549, 689, 691.1, 340/815.4, 815.73; 119/51.5, 52.1, 54, 61, 119/72, 74, 75
See application file for complete search history.

(56) References Cited

U.S. PATENT DOCUMENTS

| 2,134,104 | A | * | 10/1938 | Cressy | 73/308 |
|---|---|---|---|---|---|
| 3,211,853 | A | * | 10/1965 | Le Corvoisier | 200/84 R |
| 3,787,829 | A | * | 1/1974 | Schneier | 340/624 |
| 3,818,208 | A | * | 6/1974 | Kahl | 340/331 |
| 4,849,742 | A | * | 7/1989 | Warrington | 340/545.6 |
| 4,987,409 | A | * | 1/1991 | Jackson | 340/623 |
| 5,499,197 | A | * | 3/1996 | Fou | 210/143 |
| 5,625,344 | A | * | 4/1997 | Shukla et al. | 340/623 |
| 5,767,775 | A | * | 6/1998 | Shukla et al. | 340/623 |
| 5,845,600 | A | * | 12/1998 | Mendes | 119/51.5 |
| 6,028,520 | A | * | 2/2000 | Maehre | 340/573.1 |
| 6,057,773 | A | * | 5/2000 | Shukla et al. | 340/623 |
| 7,131,556 | B2 | * | 11/2006 | Tseng | 222/64 |
| 7,448,347 | B2 | * | 11/2008 | Richmond | 119/72 |
| 7,934,321 | B2 | * | 5/2011 | Johnson et al. | 33/333 |
| 2005/0279287 | A1 | * | 12/2005 | Kroeker | 119/72 |
| 2008/0134979 | A1 | * | 6/2008 | Crocker | 119/51.5 |

* cited by examiner

*Primary Examiner* — Daniel Wu
*Assistant Examiner* — Son M Tang
(74) *Attorney, Agent, or Firm* — Alan Kamrath; Kamrath IP Lawfirm, PA

(57) ABSTRACT

A drinking-water level alarm lamp for being placed in a water feeder includes a watertight casing including therein a lamp, a rolling ball tilt switch, a battery and a weight. When the water feeder contains drinking water, the drinking-water level alarm lamp half floats above the water by virtue of the inner space of the watertight casing and the weight. When the water feeder contains no drinking water, the drinking-water level alarm lamp lies at a bottom of the water feeder. The drinking-water level alarm lamp uses the presence and absence of the drinking water in and from the water feeder to change a position of the drinking-water level alarm lamp, so that the rolling ball tilt switch in the drinking-water level alarm lamp is accordingly switched to turn on or off the lamp.

1 Claim, 8 Drawing Sheets

DRINKING WATER LEVEL ALARM LAMP

BACKGROUND OF THE INVENTION

1. Technical Field

The present invention relates to a drinking-water level alarm lamp for being provided to a pet water feeder to conveniently indicate a low level of drinking water in the water feeder by illuminating.

2. Description of Related Art

A pet water feeder allows pets to lick drinking water from a water outlet thereof. The drinking water in the water feeder is clean for drinking and is thus usually limpid. Consequently, it is difficult for a rearer to correctly tell whether there is enough drinking water in the water feeder by observing from a far place or by taking a glance. In case of mistelling, which may frequently happen, the rearer can fail to add drinking water timely and cause pets to suffer thirst. For preventing this, the rearer has to check the water feeder closely to correctly tell whether there is enough drinking water in the water feeder.

However, when it comes to a rearer who raises plural pets at the same time or when it comes to a pet store, it is extremely inconvenient and time-consuming to check many water feeders one by one. Especially, in a dusky environment, such as at nighttime or in the occasion of power failure, it is even more difficult to observe and tell the water level in water feeders. Besides, artificial strong and focused light for illuminating water feeders and facilitating observation of water level at night may bring adverse effect to pets' natural biological rhythms.

BRIEF SUMMARY OF THE INVENTION

In view of the shortcomings of the existing approaches to telling water level in a water feeder that is attached to a pet cage, a drinking-water level alarm lamp is proposed by the present invention allowing distant observation and determination of whether there is enough drinking water in a water feeder.

The primary objective of the present invention is to provide a drinking-water level alarm lamp for being placed in a water feeder. The drinking-water level alarm lamp includes a watertight casing including therein a lamp, a rolling ball tilt switch, a battery and a weight. When the water feeder contains drinking water, the drinking-water level alarm lamp half floats above the water by virtue of the inner space of the watertight casing and the weight. When the water feeder contains no drinking water, the drinking-water level alarm lamp lies at a bottom of the water feeder. The present invention uses the presence and absence of the drinking water in and from the water feeder to change a position of the drinking-water level alarm lamp, so that the rolling ball tilt switch in the drinking-water level alarm lamp is accordingly switched to turn on or off the lamp in a preset manner, thereby informing a rearer whether the water feeder contains the drinking water or not.

BRIEF DESCRIPTION OF THE SEVERAL VIEWS OF THE DRAWINGS

The invention as well as a preferred mode of use and advantages thereof will be best understood by referring to the following detailed description of the illustrative embodiments in conjunction with the accompanying drawings, wherein.

DETAILED DESCRIPTION OF THE INVENTION

Figure 1:
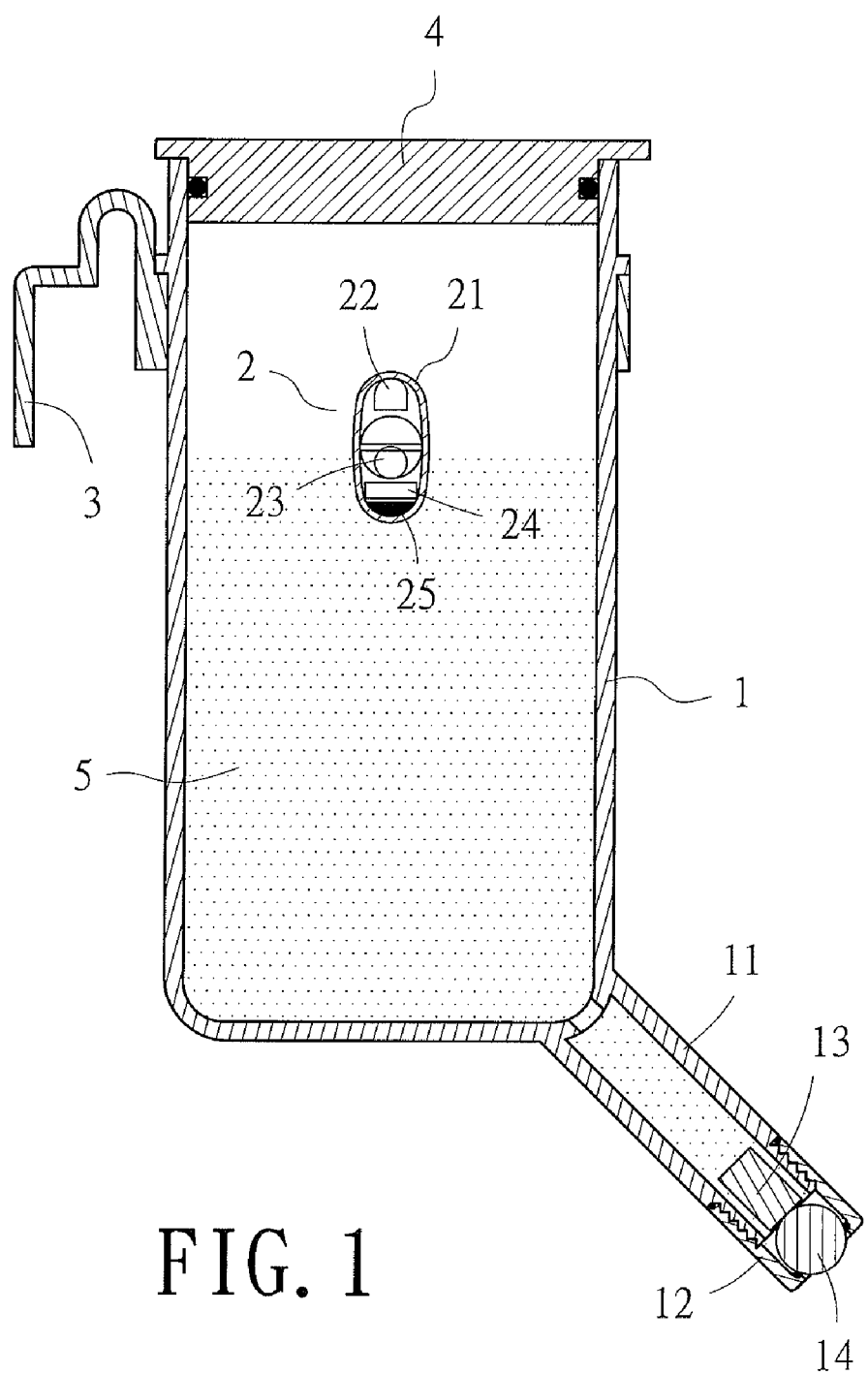
FIG. 1, according to a first embodiment, shows a drinking-water level alarm lamp of the present invention applied to a flat-bottomed water feeder that contains enough water and thus being inactivated.
Figure 2:
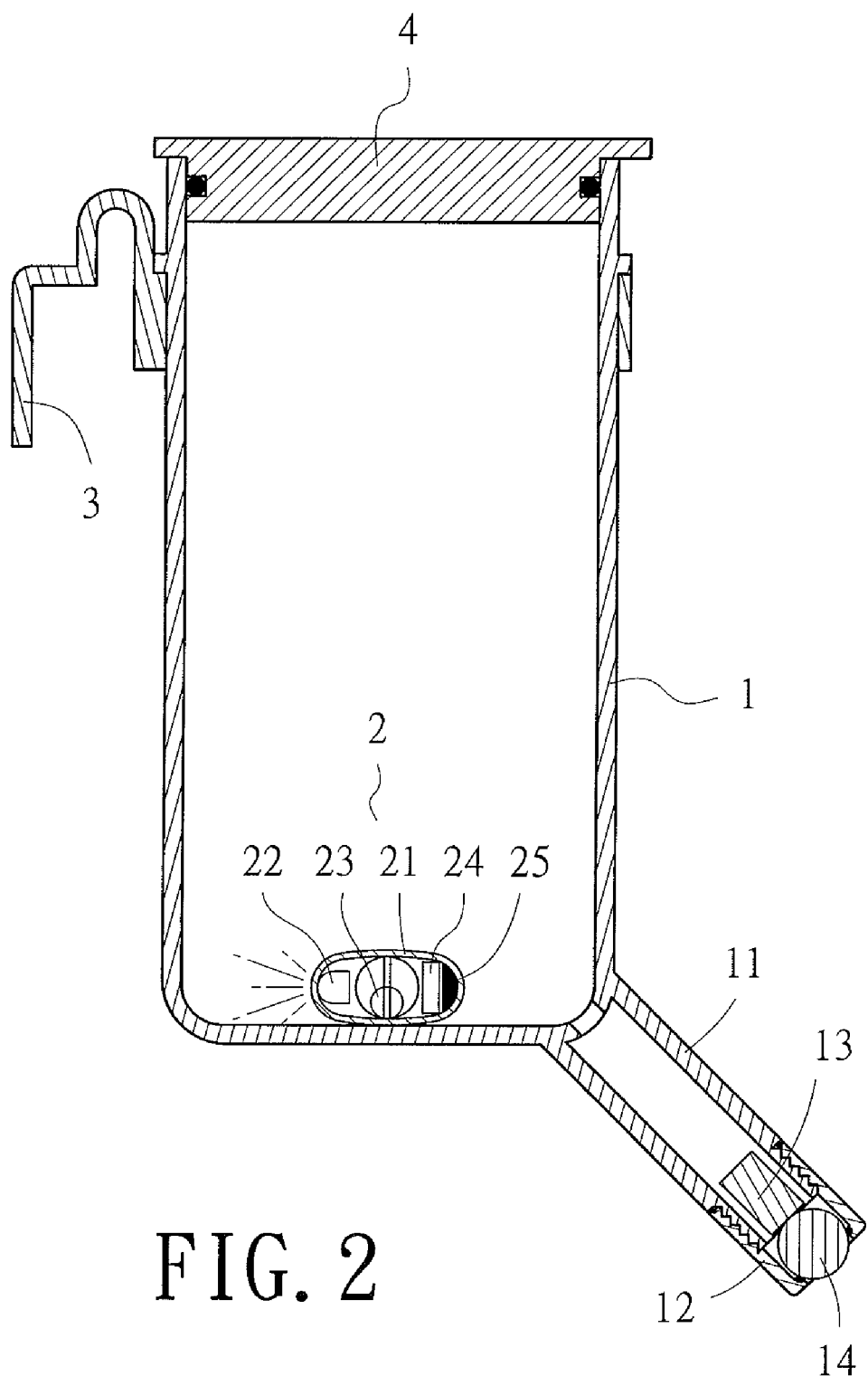
FIG. 2, according to the first embodiment, shows the drinking-water level alarm lamp of the present invention applied to the flat-bottomed water feeder that does not contain enough water and thus being activated.

According to the present invention, a drinking-water level alarm lamp 2, as shown in FIGS. 1 and 2, is configured to be placed into a water feeder 1. In the present embodiment, the water feeder 1 is positioned with respect to a pet cage by a mounting hook 3. The water feeder 1 has a water outlet 11 equipped with a movable assembly 12 composed of a weight 13 and a steel ball 14. The movable assembly 12 is configured such that it gives water when the steel ball 14 and the weight 13 are lifted and stops giving water when the weight 13 and the steel ball 14 fall by gravity. A lid 4 is mounted atop the water feeder 1 for closing the water feeder 1.

The drinking-water level alarm lamp 2 is formed by a watertight casing 21 including therein a lamp 22, a rolling ball tilt switch 23 switched by vibration or tilting which moves a ball therein, a battery 24 and a weight 25.

Referring to FIGS. 1 and 2, in a first embodiment of the present invention, when the water feeder 1 contains enough drinking water 5, the drinking-water level alarm lamp 2 half floats above the drinking water 5 by virtue of the inner space of the watertight casing 21 and the weight 25. At this time, the rolling ball tilt switch 23 is inactivated, as shown in FIG. 1. Contrarily, when the water feeder 1 contains no drinking water 5, the drinking-water level alarm lamp 2 lies horizontally at a bottom of the water feeder 1. At this time, the rolling ball tilt switch 23 is activated to light up the lamp 22, as shown in FIG. 2.

Figure 3:
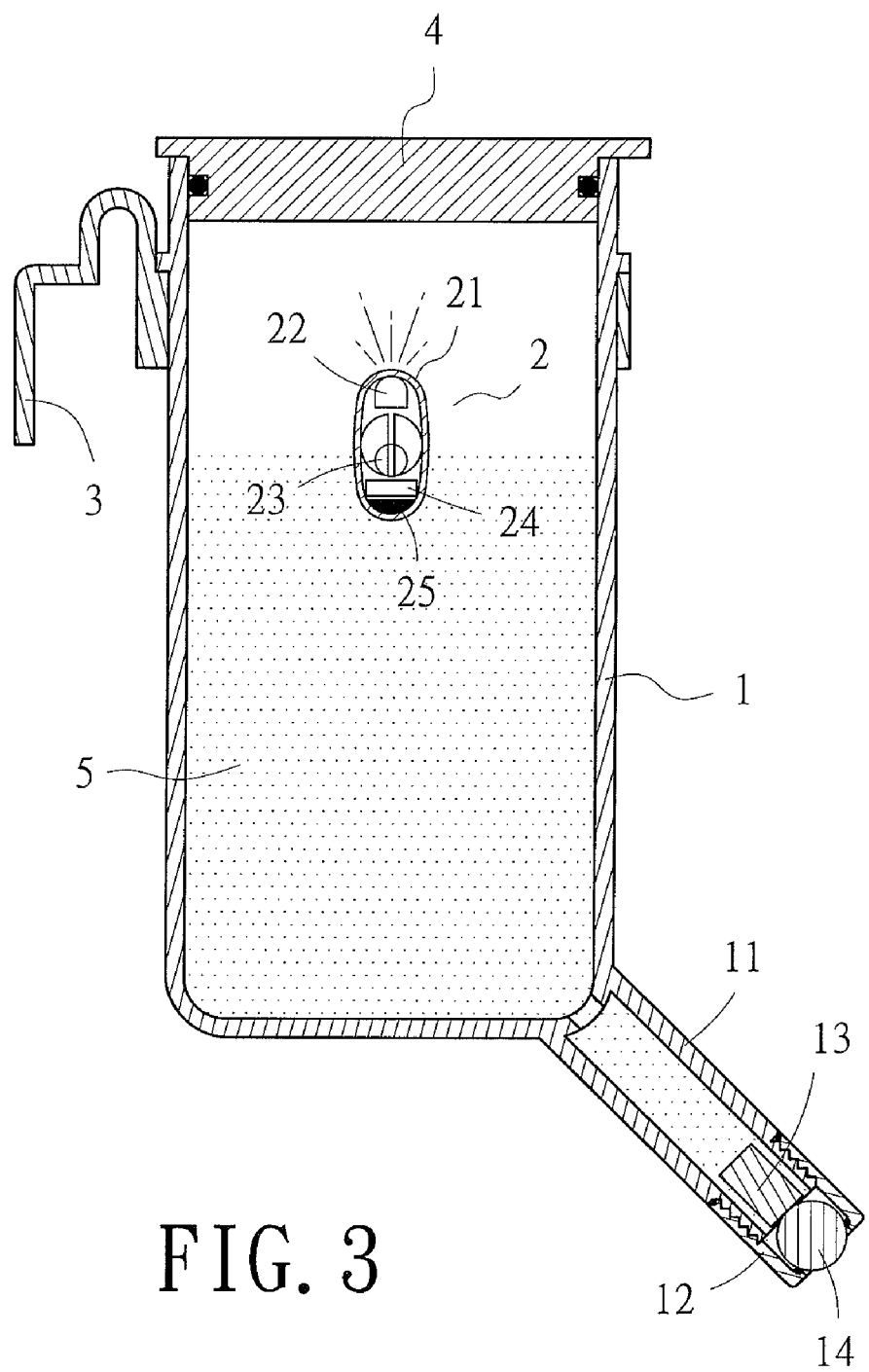
FIG. 3, according to a second embodiment, shows a drinking-water level alarm lamp of the present invention applied to a flat-bottomed water feeder that contains enough water and thus being activated.
Figure 4:
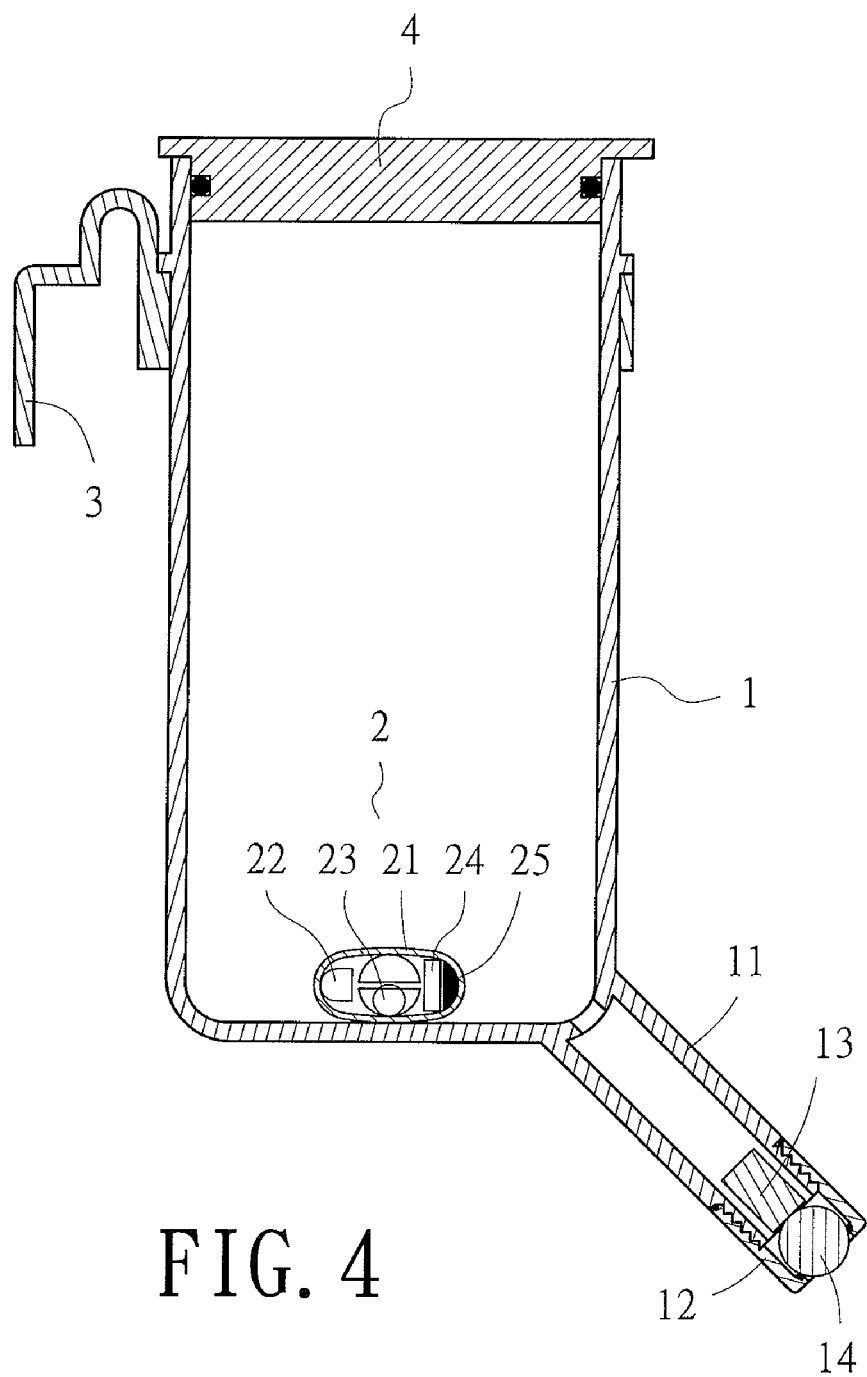
FIG. 4, according to the second embodiment, shows the drinking-water level alarm lamp of the present invention applied to the flat-bottomed water feeder that does not contain enough water and thus being inactivated.

Referring to FIGS. 3 and 4, in a second embodiment of the present invention, when the water feeder 1 contains enough drinking water 5, the drinking-water level alarm lamp 2 half floats above the drinking water 5 by virtue of the inner space of the watertight casing 21 and the weight 25. At this time, the rolling ball tilt switch 23 is activated to light up the lamp 22, as shown in FIG. 3. Contrarily, when the water feeder 1 contains no drinking water 5, the drinking-water level alarm lamp 2 lies horizontally at a bottom of the water feeder 1. At this time, the rolling ball tilt switch 23 is inactivated, as shown in FIG. 4.

Figure 5:
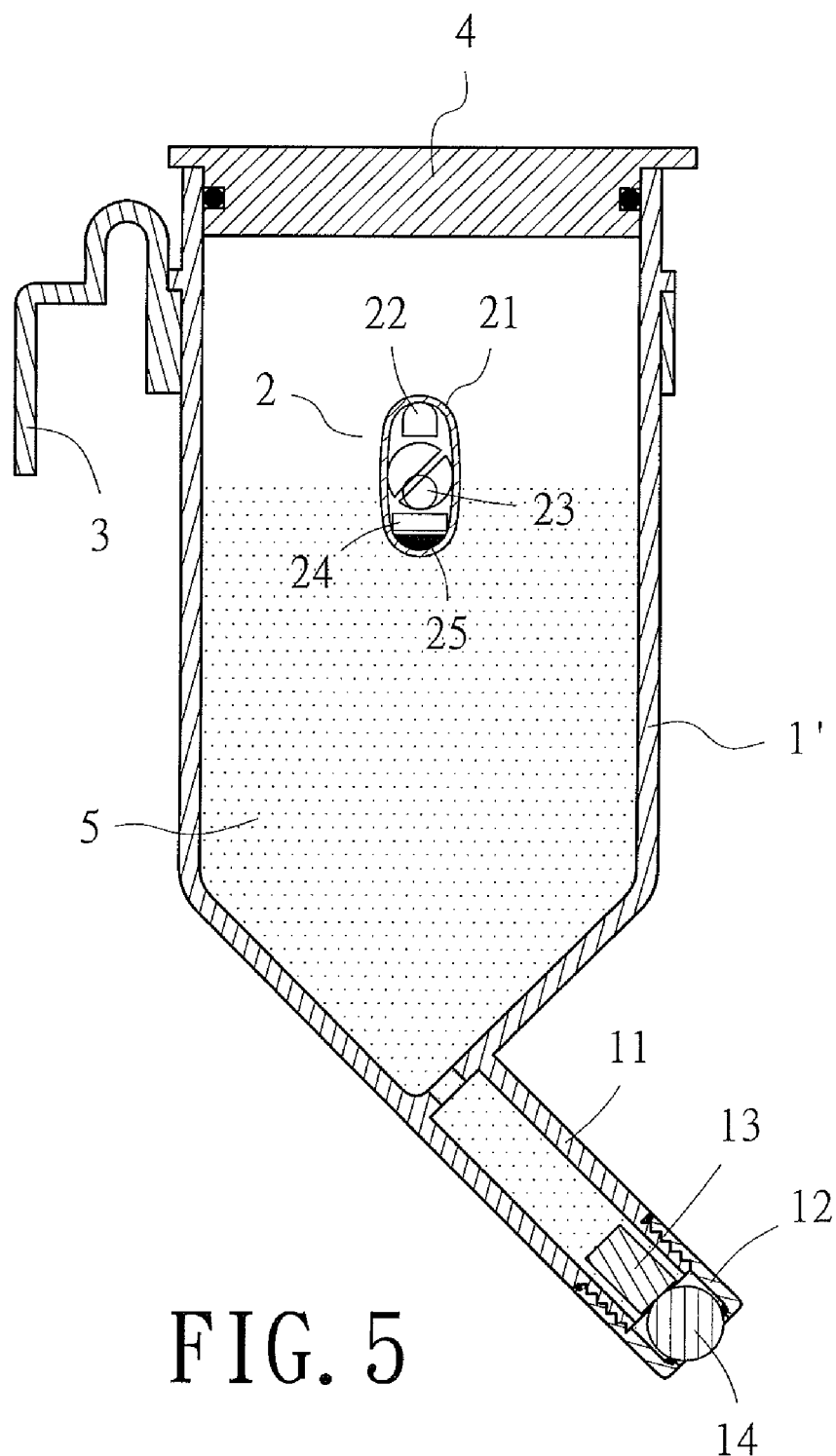
FIG. 5, according to the first embodiment, shows the drinking-water level alarm lamp of the present invention applied to a bottom-pointed water feeder that contains enough water and thus being inactivated.
Figure 6:
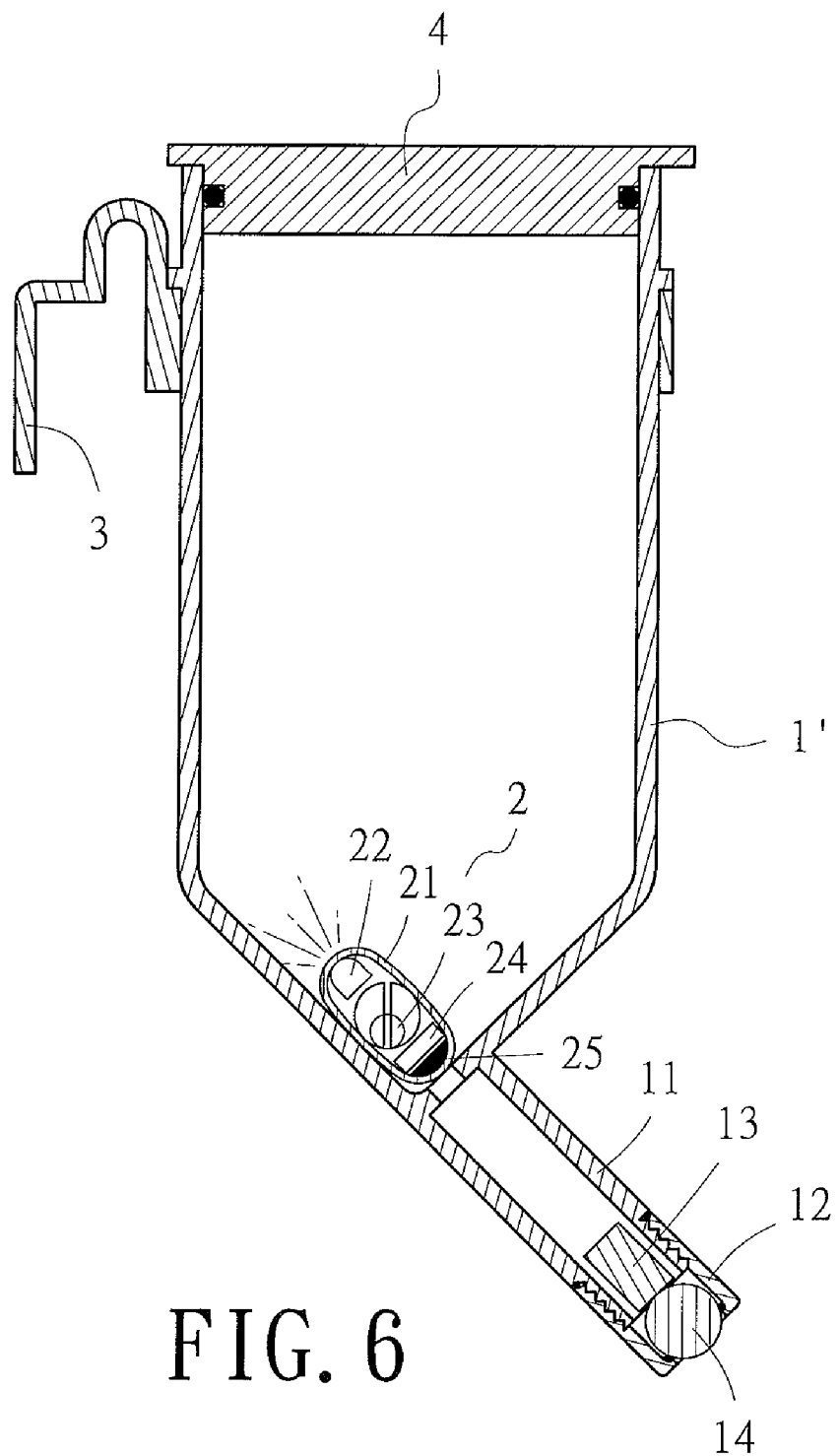
FIG. 6, according to the first embodiment, shows the drinking-water level alarm lamp of the present invention applied to the bottom-pointed water feeder that does not contain enough water and thus being activated.

Referring to FIGS. 5 and 6, in a third embodiment of the present invention, when the water feeder 1' contains enough drinking water 5, the drinking-water level alarm lamp 2 half floats above the drinking water 5 by virtue of the inner space of the watertight casing 21 and the weight 25. At this time, the rolling ball tilt switch 23 is inactivated, as shown in FIG. 5. Contrarily, when the water feeder 1' contains no drinking water 5, the drinking-water level alarm lamp 2 lies slantwise at a bottom of the water feeder 1'. At this time, the rolling ball tilt switch 23 is activated to light up the lamp 22, as shown in FIG. 6.

Figure 7:
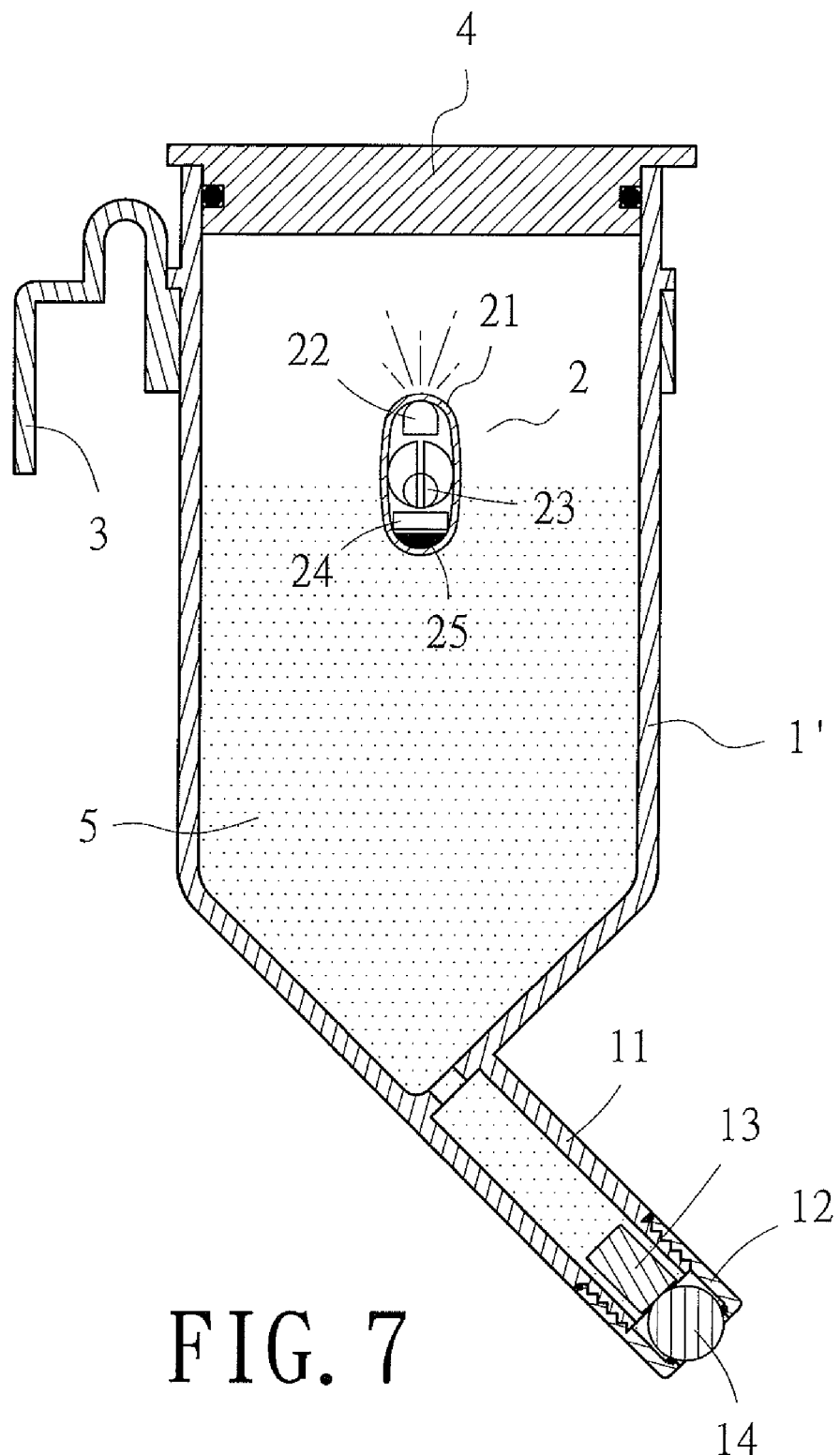
FIG. 7, according to the second embodiment, shows the drinking-water level alarm lamp of the present invention applied to a bottom-pointed water feeder that contains enough water and thus being activated.
Figure 8:
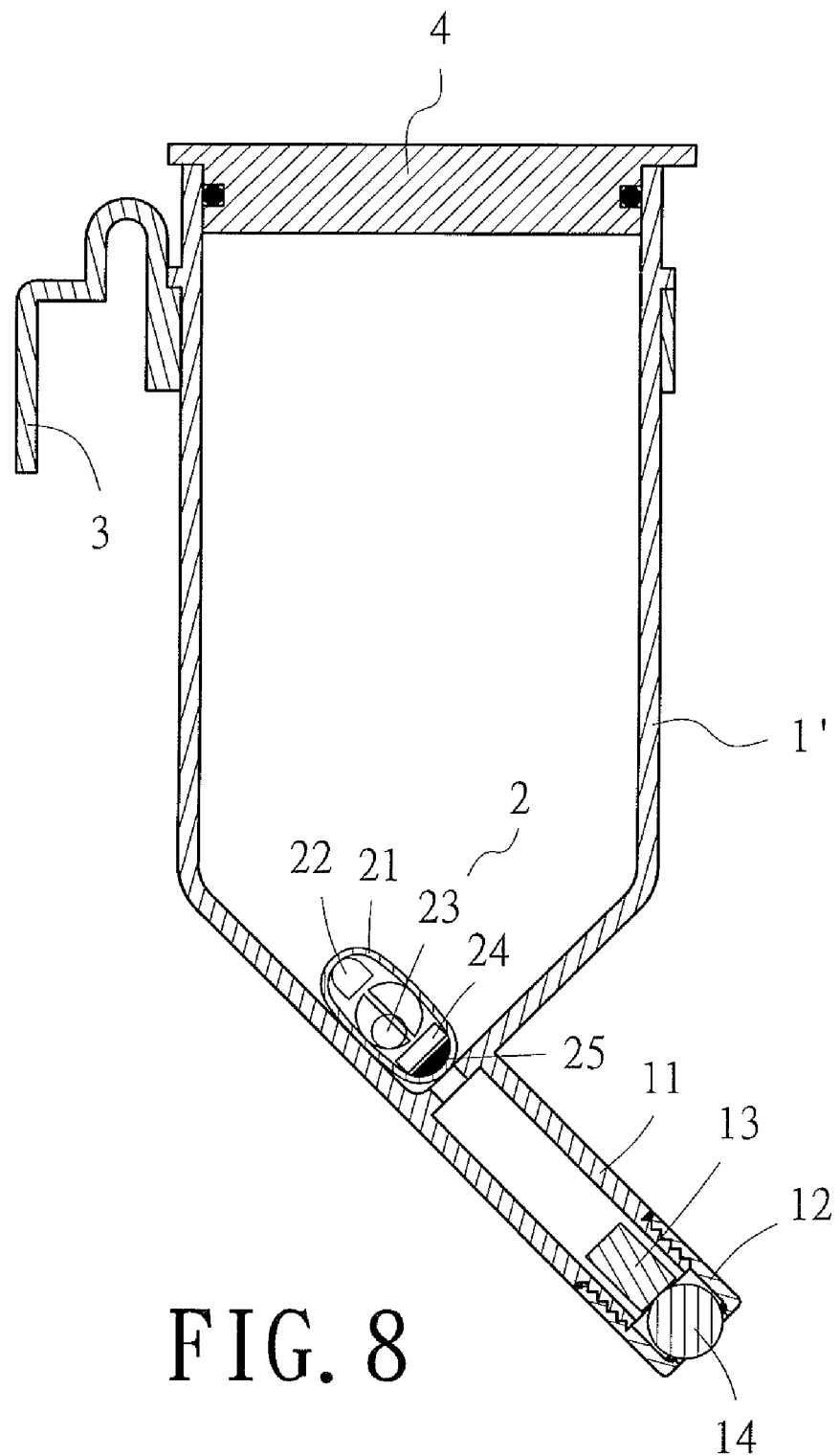
FIG. 8, according to the second embodiment, shows the drinking-water level alarm lamp of the present invention applied to the bottom-pointed water feeder that does not contain enough water and thus being inactivated.

Referring to FIGS. 7 and 8, in a fourth embodiment of the present invention, when the water feeder 1' contains enough drinking water 5, the drinking-water level alarm lamp 2 half floats above the drinking water 5 by virtue of the inner space of the watertight casing 21 and the weight 25. At this time, the rolling ball tilt switch 23 is activated to light up the lamp 22, as shown in FIG. 7. Contrarily, when the water feeder 1' contains no drinking water 5, the drinking-water level alarm lamp 2 lies slantwise at a bottom of the water feeder 1'. At this time, the rolling ball tilt switch 23 is inactivated, as shown in FIG. 8.

Thereby, a rearer can easily and correctly tell whether there is drinking water 5 in the water feeder 1 or 1' distantly by observing whether the lamp 22 is lit, regardless of being daytime or nighttime.

What is claimed is:

1. A drinking-water level alarm lamp comprising:
   a watertight casing of an elongated capsule shape including cup shaped upper and lower ends of generally equal size and shape interconnected by a generally cylindrical body;
   a lamp located inside the cup shaped upper end;
   a rolling ball tilt switch including electrically spaced first and second cup shaped portions having a gap therebetween and movably mounted in the generally cylindrical body between positions parallel to and perpendicular to the generally cylindrical body, with the rolling ball tilt switch further including a ball rollable in the first and second cup shaped portions and providing an electrical connection across the gap and between the first and second cup portions;
   a battery; and
   a weight located inside the cup shaped lower end, with the battery located intermediate the weight and the rolling ball tilt switch; wherein the watertight casing configured to be placed in a water feeder so that when the water feeder contains drinking water, the watertight casing half floats above the drinking water in virtue of an inner space of the watertight casing and the weight, and when the water feeder that does not contain drinking water, the watertight casing lies horizontally at a bottom of the water feeder;
   wherein presence and absence of the drinking water in and from the water feeder change a position of the watertight easing, wherein the rolling ball tilt switch in the watertight casing is accordingly switched to turn on or off the lamp in a preset manner, thereby informing a rearer of whether the water feeder contains the drinking water or not.

\* \* \* \* \*